May 27, 1969 — G. YATES, JR — 3,446,391
PLASTIC CONTAINER TAPE SEAL STRUCTURE
Filed Nov. 16, 1967
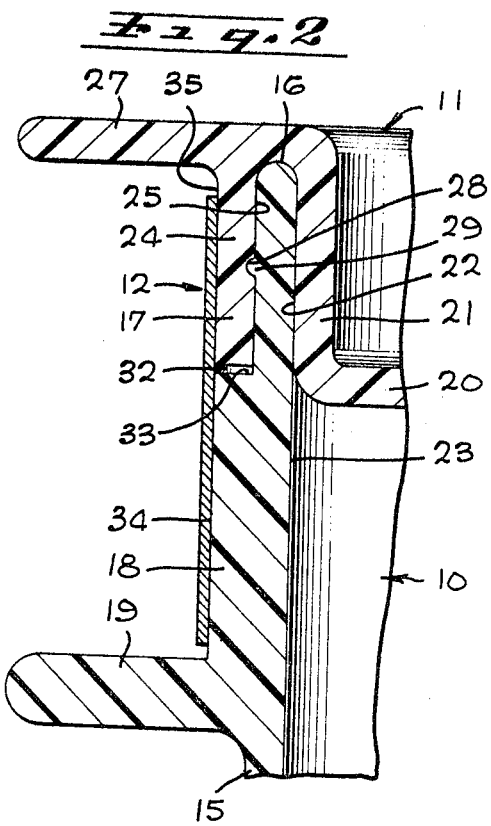
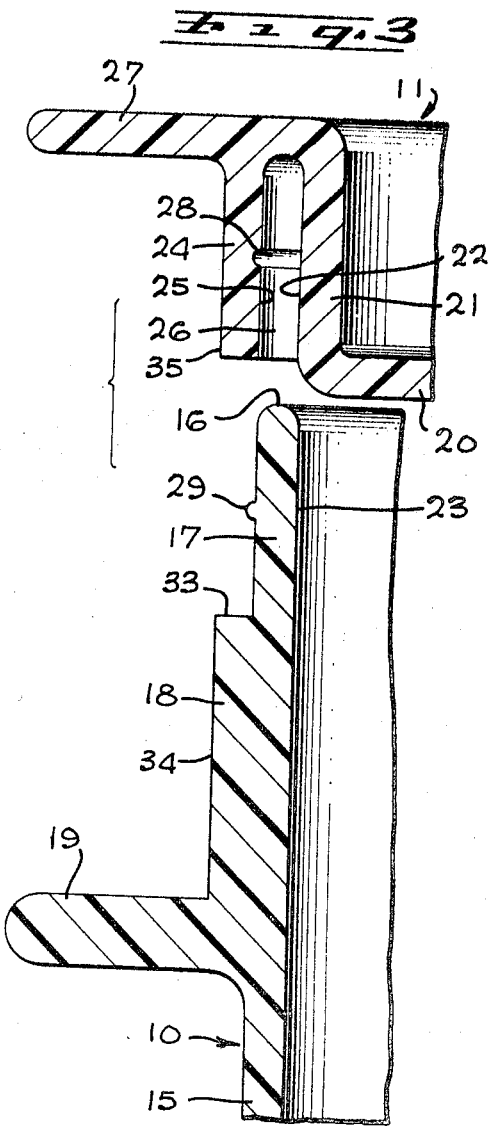
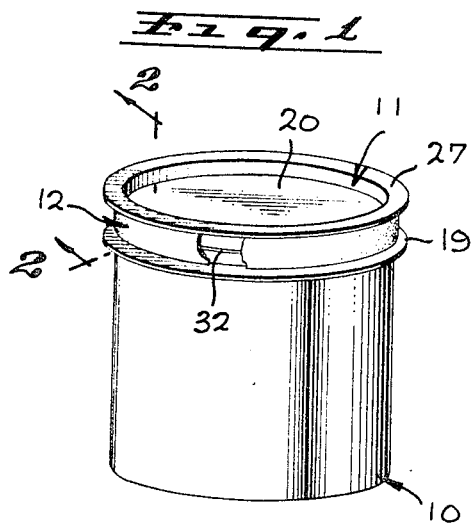
GEORGE YATES, JR.
INVENTOR.
BY
Beehler & Arant

United States Patent Office 3,446,391
Patented May 27, 1969

3,446,391
PLASTIC CONTAINER TAPE SEAL STRUCTURE
George Yates, Jr., 151 Cumberland Road,
Glendale, Calif. 91202
Filed Nov. 16, 1967, Ser. No. 683,651
Int. Cl. B65d 43/10, 17/00
U.S. Cl. 220—60
7 Claims

ABSTRACT OF THE DISCLOSURE

The invention resides in a structure consisting of a plastic container having a plastic lid interlocking with the container wherein the lid has a perimetral pocket receiving the top edge of the container, so that when the two are in engagement the exterior surfaces of both are flush with each other and an adhesive tape or band is fastened to the flush surfaces to effectively seal the closure on the container.

---

Although plastic containers have achieved considerable popularity in recent years, there continue to be problems in the use of plastic materials for this purpose. When plastic forming the container is made of rigid consistency so that the container will hold its shape, the plastic tends to be brittle and may be readily broken when the container is filled, should the container be roughly handled or perhaps dropped on a hard surface. Although plastic material may be made exceptionally tough and strong, the tough strong plastics tend to yield appreciably and the yielding character makes them difficult to seal with a seal which will stand the customary drop test, that is to say, when a filled container is dropped, as it might be when handled in the usual course of commerce. If the rim of the container where the sealing takes place deforms, the seal is very apt to be broken and the contents spilled. Because of this recognized defect in the employment of tough yieldable plastics for containers, many different kinds of expedients have been resorted to in order to reinforce the sealing rim of the container or to reinforce the closure applied to it so that the seal will remain dependable, but which at the same time can be readily broken and the closure removed in order to expose the contents.

It is among the objects of the invention to provide a new an dimproved plastic container tape seal structure whereby not only a tight seal is provided by use of the tape, but also wherein the structure which is sealed by the tape will not leak, even though deformed in the usual course of handling.

Another object of the invention is to provide a new and improved plastic container tape seal structure which is a reusable seal such that after the tape has been removed and the closure removed from the container, the closure can be reapplied with an effective seal for ordinary storage purposes, or which even on occasions may be reapplied in company with a tape seal for more permanent sealing.

Still another object of the invention is to provide a new and improved plastic container tape seal structure which not only is an adequate sealing expedient, but which is easily formed, simple in construction, and relatively inexpensive, one form of the structure in particular providing an entirely clean wall on the inside of the container so that there is no inward overlying edge which might prevent the ready removal of all of the contents.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIGURE 1 is a side perspective view of a container with the closure attached and sealed in position.

FIGURE 2 is a longitudinal sectional view taken on the line 2—2 of FIGURE 1.

FIGURE 3 is a longitudinal sectional exploded view showing the closure lifted to a location removed from the container.

In an embodiment of the invention chosen for the purpose of illustration there is shown a container 10 and clsoure 11 which when the container is closed by the closure is sealed by an adhesive tape 12. Both the container and the closure are designed to be molded out of one of the commercially available synthetic plastic resin materials such as, for example, by injection molding or other acceptable molding practice, whereby the container or closure, as the case may be, can be completely molded in one operation with variations in thickness, acceptable protrusions, depressions and pockets, and of any form or configuration which may be desired.

Although the most acceptable shape for a container and the closure fitting the container is cylindrical, it will be understood that square or other cross-sectional shapes are feasible, and are contemplated as being within the disclosure of a connection between the two.

The container 10 has a side wall 15 terminating in a rounded upper edge 16 forming the open end of the container. Inwardly from the edge 16 is an interior sealing band 17 and inwardly of the interior sealing band 17 is a tape receiving band 18, the tape receiving band being appreciably thicker than the interior sealing band 17, and approximately double the thickness. At the inner edge of the tape receiving band 18 is a reinforcing flange 19 which extends at right angles to the side wall 15 of the container.

The closure 11 is provided with a midportion 20 which substantially closes the open end of the container. Around the perimeter of the midportion 20 is a perimetral flange 21 which extends at right angles to the midportion 20 and is adapted to have its exterior surface 22 engage the interior surface 23 of the container wall 15.

Spaced from and parallel to the perimetral flange is an exterior sealing band 24, an inside surface 25 of which is spaced from the exterior surface 22 forming perimetral pocket 26. The pocket 26 is adapted to snugly receive the interior sealing band 17 of the container, in the position shown in FIGURE 2. A reinforcing flange 27 extends laterally outwardly at substantially right angles with respect to the exterior sealing band 24 and perimetral flange 21, thereby adding appreciable strength and stiffness to the closure, in the same fashion as the reinforcing flange 19 adds strength and stiffness to the upper end of the container.

To further improve the dependability of the attachment of the closure to the container, a perimetral recess 28 is provided on the inside surface 25 and a complementary perimetral projection 29 on an outside surface 30 of the interior sealing band 17. By making the recess 28 relatively shallow and the projection 29 of corresponding depth, there is sufficient resilience in the material of the exterior sealing band 24, as well as the interior sealing band 17 to permit them to yield respectively and have the projection engage the recess when in the closed position of FIGURE 2. As a matter of convenience and ease in solving manufacturing problems, there may be provided a slight clearance 32 between the innermost end edge of the exterior sealing band 24 and a shoulder 33 at the outside end of the tape receiving band 18. Furthermore, it will be particularly noted that the outside surface 34 of the tape receiving band 18 is substantially flush with the outside surface 35 of the exterior sealing band 24, so that the tape 12 with an adhesive on its inside surface is applied flush with both of them over an appreciable area entirely surrounding both the container and the closure.

When the closure 11 is moved into closed position on the container 10, from the removed position of FIGURE 3 to the closed position of FIGURE 2, the interior sealing band 17 is pushed into the pocket 26 in which it snugly fits until the projection 29 engages with the recess 28. This is a relatively tight liquid-proof seal and is sufficient in itself to form a seal for the container for storage purposes. For the shipment, however, and handling especially of a full container, the tape 12 is applied to the outside surfaces 34 and 35, as, described, and there is sufficient strength provided in an ample adhesive area to form of the joint a particularly stiff, tight, dependable seal for shipping purposes. When the closure is to be removed, it is necessary no more than to remove the tape, after which the closure can be pried free from the container giving access to the contents. The flanges 19 and 27 are also helpful in providing an agency for prying purposes when the closure is to be pried loose.

While the invention has herein been shown and described in what is conceived to be a practical and effective embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A sealed container structure of synthetic plastic resin material comprising a container member and a closure member, one of said members having a perimetral side wall with a perimetral edge forming an open end of said member, a tape receiving band spaced axially inwardly from said perimetral edge and an interior sealing band between the tape receiving band and said perimetral edge, said interior sealing band having a wall thickness less than the wall thickness of said tape receiving band, a perimetral closure flange around the perimeter of said other member, an exterior sealing band on said other member surrounding said closure flange and spaced from said closure flange at a distance substantially equal to the thickness of said interior sealing band and forming a perimetral pocket, said pocket being occupied by said interior sealing band when said one member is in closed relationship with said other member, the exterior surface of said exterior sealing band being flush with the exterior surface of said tape receiving band, and a sealing tape in adhesive engagement with both said exterior surfaces throughout the entire perimetral extent thereof whereby to seal said closure member with respect to said container member.

2. A sealed container structure according to claim 1 wherein there is a recess extending around the perimeter of one of said sealing bands on the face thereof facing the other sealing band, and a projection extending around said other sealing band removably received in said recess, said recess and said projection being at a location within said pocket.

3. A sealed container structure according to claim 1 wherein there is a laterally outwardly extending flange at an edge of said exterior sealing band adjacent the bottom of said pocket.

4. A sealed container structure according to claim 1 wherein there is a laterally outwardly extending flange at one edge of said tape receiving band farthest removed from said interior sealing band.

5. A sealed container structure according to claim 3 wherein there is a laterally outwardly extending flange at the edge of said tape receiving band farthest removed from said interior sealing band, said outwardly extending flanges being spaced apart a distance no closer together than the width of said tape.

6. A sealed container structure according to claim 1 wherein the closure flange and the exterior sealing band have lengths not less than the length of said interior sealing band whereby to provide said pocket with a depth sufficient to receive the entire length of said interior sealing band.

7. A sealed container structure according to claim 2 wherein said recess is at a location removed axially from a free edge of said exterior sealing band.

References Cited

UNITED STATES PATENTS

| 3,231,078 | 1/1966 | Balocca et al. | 220—53 |
| 3,244,306 | 4/1966 | Stolk | 220—53 |
| 3,355,056 | 11/1967 | Fisch | 220—42 |
| 3,355,061 | 11/1967 | Ritter | 220—60 |

GEORGE T. HALL, Primary Examiner.

U.S. Cl. X.R.

150—.5; 229—51